United States Patent [19]

Bruen et al.

[11] 3,852,059

[45] Dec. 3, 1974

[54] PROCESS FOR THE PRODUCTION OF SODIUM CHROMATE FROM CHROMITE ORE

[75] Inventors: Charles Patrick Bruen, Bernardsville, N.J.; William Wayne Low, Syracuse; Edmund Walter Smalley, Brewerton, both of N.Y.

[73] Assignee: Allied Chemical Corporation, New York, N.Y.

[22] Filed: Mar. 9, 1972

[21] Appl. No.: 233,351

[52] U.S. Cl............................ 75/3, 423/53, 423/61, 252/188.3, 264/15
[51] Int. Cl................................................ C22b 1/14
[58] Field of Search...... 423/61, 53; 75/.5 R, .5 AB, 75/3; 252/188.3; 264/15

[56] References Cited
UNITED STATES PATENTS

| | | | |
|---|---|---|---|
| 2,394,793 | 2/1946 | Maier........................................ | 75/3 |
| 2,501,952 | 3/1950 | Maier...................................... | 423/62 |
| 2,931,717 | 4/1960 | Lee............................................ | 75/3 |
| 3,095,266 | 6/1963 | Lauder et al...................... | 423/61 |
| 3,235,371 | 2/1966 | Volin et al................................ | 75/3 |

Primary Examiner—Herbert T. Carter
Attorney, Agent, or Firm—Gerard P. Rooney; Jack B. Murray, Jr.

[57] ABSTRACT

A method of producing sodium chromate from chromite ore, which involves mixing the ore with sodium carbonate and a refractory diluent, pelleting the mixture using an aqueous solution of sodium hydroxide, potassium hydroxide, sodium aluminate, sodium silicate, sodium chromate, or mixtures thereof; drying and roasting the pellets under oxidizing conditions, then disintegrating and extracting the pellets to obtain an aqueous solution of sodium chromate.

The use of these solutions as pelleting liquids provides pellets of sufficient strength to withstand handling and roasting in a rotary kiln.

13 Claims, No Drawings

PROCESS FOR THE PRODUCTION OF SODIUM CHROMATE FROM CHROMITE ORE

CROSS-REFERENCE TO RELATED APPLICATIONS

Co-filed U.S. patent applications, "Method for Recovering Chromium Values from Chromium Ore" and "Method for the Conversion of Chromite Ore to Sodium Chromate," Ser. No. 233,286 filed Mar. 9, 1972 and Ser. No. 233,128 filed Mar. 9, 1972, respectively.

BACKGROUND OF THE INVENTION

I. Field of the Invention

This invention relates to the manufacture of chromates and more particularly, to a method for the alkaline roasting of chromite ore.

II. Description of the Prior Art

In the past, chromite ore has been dried, powdered, mixed with an alkali carbonate such as soda ash, leached residue, and an alkaline earth compound such as lime. It has then been charged into a rotary kiln wherein it was subjected to high temperatures and oxidizing conditions.

The procedure has several disadvantages. Fines are carried through the furnace introducing losses and creating a noxious atmosphere. Furthermore, at the high temperatures obtained during the roating process, the powdered charge becomes viscid and as a result the material agglomerates or forms deposits upon the walls of the kiln thus interfering with its operation. the reactive surface is considerably diminished by the agglomeration so that the oxidation reaction is generally incomplete. This action is reflected in poor yields of sodium chromate.

In an attempt to overcome these disadvantages, more recent processing techniques involve pelleting the feed mix. In order to obtain pellets with sufficient strength to withstand the stresses introduced by the use of a rotary kiln, it has been considered necessary to add alkaline earth compounds lime generally being the compound selected. Processes disclosed in the prior art which involve the use of pellets, indicate that lime or an alkaline earth compound is necessary for successfully pelleting the furnace or kiln feed. The need for the lime stems from the requirement that the pellets or balls have sufficient strength to survie handling and the stresses introduced by the roasting operation. The use of lime or other alkaline earth agents has, in fact, been essentially the only known way of achieving this strength. The amount of lime introduced has been considered critical. In addition, a high temperature pretreatment was considered necessary to achieve adequate pellet strength.

Whereas, this procedure furnished a solution to the problems encountered in the alkaline roasting of the ore, the use of lime introduced new difficulties into the processing of the chromite ore, which although long recognized, had not been overcome.

The presence of lime in the roast results in the formation of slimes in the subsequent leaching operation. This has forced the continued use of archaic leach cars or other difficult and expensive operations. These slimes result in poor recovery of the chrome values and complicate considerably, the task of rendering the leach residue harmless, from a pollution standpoint.

Lime is also used in most non-pellet processes because of its action as a diluent to prevent sticking.

There are many known ways of producing balls or pellets from powdered mixes. They range from mechanical presses or rolls to the balling drums or rotating pans commonly used in the processing of iron ore. The latter two are probably the most common. In the manufacture of chrome chemicals, it is highly advantageous to use a pelleted feed in the roasting operation. As noted, the pellet form, as opposed to powdered mixes, reduces dust problems. It also reduces the tendency for tacky masses to stick to the kiln walls ("ringing") and serves to prevent the formation of large lumps. It also greatly reduces the amount of refractory diluent required to prevent sticking, reduces segregation of the ingredients within the mix, and permits both higher kiln loadings and better heat transfer.

After the roasting step the pellet form has no advantage, and may be a disadvantage if the pellets are so hard as to interfere with the rapid and complete leaching of the soluble sodium chromate. It is therefore most desirable that, after the roasting step, the pellets be easy to disintegrate. Such pellets not only provide better product yields, but a residue suitable for recycle, or sufficiently innocuous for discard.

Water is generally the liquid used to plasticize the dry mix for the production of the green ("wet, untreated") balls or pellets. Pellets so formed with water have considerable wet strength, but such strength is lost as soon as the pellets are dried. For the production of chrome chemicals, the green pellets must have sufficient strength to be handled and conveyed, and to survive any preliminary heat treating step required. Finally, they must have sufficient strength to survive transfer to the kiln and particularly the roasting step. In the past, essentially the only known method of producing an anhydrous pellet of powdered chrome ore, sodium carbonate and recycled residue or other refractory diluent having the required strength, was to add an alkaline earth compound such as lime to the mixture, and this was done even though it was known that the introduction of such an alkaline earth compound would add to the difficulties of leaching the sodium chromate from the roasted and disintegrated pellet.

SUMMARY OF THE INVENTION

It has now been found, surprisingly, that if at least one aqueous solution prepared from an electrolyte selected from the group consisting of sodium hydroxide, potassium hydroxide, sodium aluminate, sodium silicate, sodium chromate or a mixture thereof, in a concentration of at least about 5 percent by weight, is substituted for water in the normal balling or pelleting process, anhydrous pellets of good strength can be achieved. It has also been found that the use of one or more of these solutions in this manner is effective for a wide range of typical mixes such as: chromite ore/soda ash/pyrites cinder; chromite ore/soda ash/recycled extracted residue, or chromite ore/soda ash mixtures. It is also effective over a wide range of the ratios of these components to each other.

We believe that these solutions function by inhibiting the formation of the hydrates of sodium carbonate, and particularly the decahydrate ($Na_2CO_3 \cdot 10H_2O$) by modifying the $Na_2CO_3$-$H_2O$ phase diagram. We have found evidence indicating that the presence of sodium carbonate decahydrate may be responsible for the formation of dry pellets which lack structural strength. When sodium carbonate decahydrate forms in a wet pellet, such a pellet has considerable wet strength, which disappears when the water of hydration is driven off in the drying process.

Of those electrolytes mentioned, sodium hydroxide is most advantageous and preferred. When references are made herein to "pellets" and "pelleting," such references include other similar forms and procedures such as those known respectively in the art as "balls" and "balling."

DESCRIPTION OF THE PREFERRED EMBODIMENT

The process of the present invention is directed to a method of obtaining solutions of sodium chromate from chromite ore. More particularly, the process is directed to a method for producing pellets of a mixture of chromite ore, soda ash and a refractory diluent, said pellets having sufficient strength to withstand the stress of handling and of roasting in a rotary kiln, without the inclusion of lime or other alkaline earth compounds in their composition and without the difficulties which attend the use of such compounds.

As illustrative of the preferred method of the present invention, a portion of dry chromite ore is comminuted and mixed with finely divided soda ash, the quantity of which may vary from 80 to 200 percent and preferably, from 100 to 140 percent of the stoichiometric amount required to produce sodium chromate from the chromium values present in the ore. In addition, a quantity of a refractory diluent is incorporated into the mixture in an amount equal to between 0 and 200 percent or preferably, between 30 and 150 percent of the weight of the chromite ore used. This mixture is fed into pelleting apparatus, and before or preferably during the pelleting operation, an electrolyte comprising an aqueous solution of sodium hydroxide, potassium hydroxide, sodium aluminate, sodium silicate or sodium chromate, having a concentration of at least about 5 percent by weight, preferably 5 to 55 percent, or more desirably 5 to 30 percent is sprayed onto the mixture in an amount sufficient to contribute 0.5 to 25 percent, preferably 1 to 20 percent, or more desirably 2 to 10 percent of the chosen compound, to the weight of the pellet (dry basis).

The green pellets are next dried at a temperature up to about 500°C. or preferably, between 100° and 500°C. The dry pellets are now roasted in a rotary kiln under oxidizing conditions at temperatures within the range of 900° to 1,350°C. or preferably, between 925° and 1,260°C. Finally the roasted pellets are cooled, crushed, and extracted with water to obtain an aqueous solution of sodium chromate, known to those skilled in the art as "yellow liquor." The extracted residue is washed with water, which wash can be combined with the sodium chromate solution, and the residue is either discarded or dired and crushed for recycle as the refractory diluent.

The "refractory diluent" previously indicated as one of the components of the mix which was to be pelleted, may be selected from anyone of a large number of refractory materials. A partial list of such materials known in the art includes pyrites cinder, iron oxide, and recycled extracted chromite ore residues from the present process, sometimes termed "refuse." These and many other refractory materials have been found to serve as satisfactory diluents.

Generally speaking, when the extracted ore residue is recycled, only a portion is so used, the balance being held as by-product, or discarded. Because of the structure of the pellets, the ease with which they are disintegrated after the roasint step, and the fact that there is no lime present to produce slimes, the sodium chromate can be extracted rapidly, economically, and in exceptionally good yield. It is entirely possible to recover considerably better than 90 percent of the available chromium by the method of this process.

In the examples that follow, and throughout this specification, all parts and percentages are on a weight basis.

EXAMPLE 1

48.5 Parts of dry comminuted chromite ore containing about 45 percent $Cr_2O_3$ are mixed with 35.5 parts of finely divided soda ash representing about 117 percent of the stoichiometric amount required to produce sodium chromate from the chromium value of the ore. In addition, 16 parts of dry comminuted pyrites cinder is added to the mixture. This charge is balled or pelleted on a 40 inch (diameter) balling pan, while 22.3 parts of a 10.7 percent aqueous solution of sodium hydroxide is sprayed on the mixture as the balling fluid, thereby contributing 2.3 parts of sodium hydroxide to the pellets (dry basis). These pellets are found to contain 16.25 percent water. Another mixure having the identical composition is balled or pelleted on a 40 inch balling pan, using 27.4 parts of water in the form of a spray, as the balling liquid. These pellets are found to contain 21.5 percent water.

The pellets formed are tested for compressive strength using a "compression tester," model LPCM, John Chatillon and Son, New York, N.Y. In each instance, about 10 pellets are tested in order to obtain an average figure. The pellet formed by the method given above are tested for compressive strength when first formed and after drying at 200°C. The results follow:

Compressive Strength (force applied in pounds to fracture pellet:)

| "Balling liquid" | Wet Pellet | Anhydrous Pellet |
|---|---|---|
| 10.7% NaOH | 2.6 | 13.1 |
| water | +40 | fractured during drying — not strong enough to stand drying at 200°C. |

EXAMPLE 2

40.6 Parts of dry comminuted chromite ore containing about 45 percent $Cr_2O_3$ is mixed with 30.2 parts of finely divided $Na_2CO_3$ representing about 118 percent of the stoichiometric amount required to produce sodium chromate from the chromium value of the ore. In addition, 29.2 parts of dry comminuted pyrites cinder is added to the mixture. This mixture is "balled" or pelleted on a 40 inch balling pan while 38.0 parts of a 10.7 percent aqueous solution of sodium hydroxide is sprayed on the mixure to thereby contribute 3.9 parts of sodium hydroxide to the pellets (dry basis). These pellets are found to contain 24.6 percent water.

The pellets formed by the method given above are tested for compressive strength when first formed; after curing for 30 minutes; and after drying at 200°C. The results follow:

Compressive Strength (force applied to fracture pellet):

| | |
|---|---|
| Wet Pellet Freshly Formed: | 2.4 lbs. |
| Wet Pellet (after standing 30 min. at ambient temperature): | 20.4 lbs. |
| Pellet dried at 200°C.: | 23.1 lbs. |

EXAMPLE 3

40.6 Parts of dry comminuted chromite ore containing about 45 percent $Cr_2O_3$ is mixed with 30.2 parts of finely divided $Na_2CO_3$ is mixed with 30.2 parts of finely divided $Na_2CO_3$ representing about 118 percent of the stoichiometric amount required to produce sodium chromate from the chromium value of the ore. In addition, 29.2 parts of dry comminuted extracted chromium ore "refuse" or residue is added to the mixture as recycle. Portions of this mixture are balled or pelleted on an 11 inch (diameter) laboratory balling pan using different strengths of squeous sodium hydroxide as the balling liquid. The results follow:

| Balling Liquid | % NaOH In Dry Pellet | % $H_2O$ In Wet Pellet | Compressive Strength, lbs.: | |
|---|---|---|---|---|
| | | | Wet Pellet | Anhydrous Pellet |
| 10.5% NaOH | 3.4 | 21.9 | 2.8 | 7.3 |
| 15.2% NaOH | 4.0 | 17.8 | 1.6 | 21.4 |
| 19.6% NaOH | 4.8 | 16.1 | 1.8 | 24.1 |
| 31.2% NaOH | 8.8 | 16.3 | 1.7 | +27.5 |
| 40.2% NaOh | 10.9 | 13.5 | 1.8 | +27.5 |
| 49.5% NaOH | 13.4 | 11.8 | 2.2 | +27.5 |
| Water | 0.0 | 25.4 | 4.0 | <1.0 |

EXAMPLE 4

57 Parts of drycomminuted chromite ore containing about 45 percent $Cr_2O_3$ are mixed with 43 parts of finely divided $Na_2CO_3$ representing about 120 percent of the stoichiometric amount required to produce sodium chromate from the chromium value of the ore. Portions of this mixture are balled or pelleted on an 11 inch laboratory balling pan while spraying on the mixture, an aqueous solution of sodium hydroxide of various strengths as shown in the accompanying table.

The pellets formed by the method given above are tested for compression strength when first made and after drying at 200°C. The results follow:

| Balling Liquid | % NaOH In Dry Pellet | %$H_2O$ In Wet Pellet | Compressive Strength, lbs.: | |
|---|---|---|---|---|
| | | | Wet Pellet | Anhydrous Pellet |
| Water | — | 33.6 | 17.4 | 1.0 |
| 8.2% NaOH | 3.2 | 26.4 | 2.3 | 3.4 |
| 19.6% NaOH | 5.5 | 18.5 | 1.2 | 9.8 |
| 25.8% NaOH | 6.8 | 16.3 | 1.2 | 22.2 |
| 31.2% NaOH | 8.4 | 15.6 | 1.5 | +27.5 |
| 49.5% NaOH | 12.0 | 10.9 | 1.4 | +27.5 |

These results demonstrate that when the extracted chromium ore residue is not included as a component of the mix, aqueous sodium hydroxide solutions are nevertheless effective in producing strong anhydrous pellets from the chrome ore, soda ash mix.

EXAMPLE 5

The following example is carried out using the same dry mixture as reported in Example 3, but using aqueous potassium hydroxide rather than sodium hydroxide as the balling liquid. The pellets formed are tested for compressive strength when first made and after drying at 200°C. The results follow:

| Balling Liquid | % KOH in Dry Pellet | %$H_2O$ in Wet Pellet | Compressive Strength, lbs.: | |
|---|---|---|---|---|
| | | | Wet Pellet | Anhydrous Pellet |
| 21.7% KOH | 5.6 | 16.8 | 1.5 | 23.6 |

A comparison of this result with the results of Example 3 demonstrates the fact that potassium hydroxide is substantially as effective as sodium hydroxide in the production of strong anhydrous pellets.

EXAMPLES 6, 7, and 8

40.4 Parts of dry comminuted chromite ore containing about 45 percent $Cr_2O_3$ is mixed with 30.3 parts of finely divided $Na_2CO_3$ representing about 120 percent of the stoichiometric amount required to produce sodium chromate from the chromium value of the ore. In addition, 29.3 parts of dry comminuted extracted chromium ore residue is added to the mixture as recycle. Portions of this mixture are balled or pelleted on an 11 inch diameter balling pan while spraying on squeous solutions of sodium aluminate, sodium silicate, and sodium chromate. The pellets formed by the method given above are tested for compressive strength when first made and after drying at 200°C. The results follow:

| Example | Balling Liquid | % $H_2O$ in Wet Pellet | Compressive Strength, | |
|---|---|---|---|---|
| | | | Wet Pellet, lbs. | Anhydrous Pellet, lbs. |
| 6 | 30.5% sodium aluminate | 17.4 | 1.4 | 23.7 |
| do. | 40.7% sodium aluminate | 15.9 | 1.9 | 26.5 |
| 7 | 22.9% sodium silicate | 25.4 | 12.9 | 10.5 |
| do. | 30.5% sodium silicate | 22.8 | 27.6 | 17.9 |
| 8 | 30.3% sodium chromate | 15.8 | 1.3 | 10.1 |
| do. | 40.5% sodium chromate | 16.6 | 2.1 | 10.3 |

These results demonstrate that aqueous solutions of sodium aluminate, sodium silicate and sodium chromate are also effective in producing strong anhydrous pellets. It should also be noted that in the case of the sodium silicate solution, both the wet strengths and dry strengths of the anhyd. pellets are high.

The advantages of pelleting the feed mix which is roasted in the production of chrome chemicals are well known. To adequately take advantage of a pelleted feed in the production of chrome chemicals, the green pellet must have sufficient strength to be handled, conveyed, and to survive the required drying step. They must also have sufficient strength when dried, to survive the roasting operation. Generally, any mixture that has been ground sufficiently fine can be pelleted by known techniques, but such green pellets do not have appreciable strength. The figure, regardless of the compound, usually falls between 0.5 and 3.0 lbs. Such pellets are generally plastic and will take some deformation. This strength is usually adequate for the handling required. If the anhydrous pellets are to be transferred to kilns, however, and are to survive the roasting operation, the strength must be at least about 5 lbs. and preferably, 8.0 to 10.0 lbs. or more. In the chromite ore pellets of the prior art, the strength of the dry or anhydrous pellet is achieved by incorporating lime in the mixture and this generally in combination with high temperature treatment prior to charging the kiln.

By the substitution of aqueous solutions of certain ionizable alkali metal alkalies or salts termed "electrolytes," for the water normally used for pelleting, a number of advantages are achieved over and above those directly associated with the elimination of the use of lime. First, an adequate initial green pellet strength of about 2 to 3 lbs. is routinely achieved. Secondly, a strength of 8 to 10 lbs. or more, is maintained after the critical dry or anhydrous state is achieved. A unique feature of this process is that high temperature "pretreatments" are not required to develop adequate strength for physical transfer of the pellets, and their survival in the kiln. In addition, these pellets disintegrate much more easily after roasting, then do those containing lime, a characteristic which offers a distinct process advantage. The effectiveness of the use of these electrolytes as pelleting fluids in the production of pellets having the necessary dry strength is quite surprising, particularly in view of the wide use of lime or other alkaline earth compounds for this purpose in the processes of the prior art.

The results achieved by the process of the present invention are surprising and entirely unexpected. A notable feature and advantage of the present invention, particularly with respect to the use of the preferred sodium hydroxide solution, is that it provides pellets having the desired dry strength without introducing foreign elements and contamination.

Since certain changes may be made in carrying out the above process without departing from the scope of the invention, it is intended that all matter contained in the above description shall be interpreted as illustrative and not in a limiting sense.

We claim:

1. A method of producing a green pellet which comprises pelleting a composition prepared by mixing chromite ore with sodium carbonate employing as a pelleting liquid an aqueous solution containing at least about 5 percent by weight of at least one electrolyte selected from the group consisting of sodium hydroxide, sodium aluminate, sodium silicate, and sodium chromate in the absence of added alkaline earth compound, said pelleting liquid being employed in an amount sufficient to contribute about 0.5 to 25 percent of said electrolyte to the weight of the pellet, dry basis.

2. The method of claim 1 wherein said electrolyte is sodium hydroxide.

3. The method of claim 1 wherein said aqueous solution contains said electrolyte in a concentration of 5 to 55 percent by weight.

4. The method of claim 1 wherein the green pellets are dried at a temperature up to 500°C.

5. The method of claim 1 wherein soda ash is present in the amount of between 80 and 200 percent of the stoichiometric amount required to convert the chromium values present in the ore to sodium chromate.

6. The method of claim 1 wherein the pelleting composition contains a refractory diluent in an amount up to 200 percent of the weight of the chromite ore.

7. The method of claim 6 wherein the refractory diluent is recycled chromite ore residue.

8. The method of claim 6 wherein the refractory diluent is pyrites cinder.

9. The method of claim 1 wherein the aqueous solution contains said electrolyte in a concentration of 5 to 30 percent by weight and being employed in an amount sufficient to contribute about 1 to 20 percent by weight of said electrolyte to the pellets, dry basis.

10. A green pellet composed of a mixture of chromite ore with soda ash in the proportion of 80 to 200 percent of the stoichiometric amount required to produce sodium chromate from the chromium value of the ore; having incorporated as a pelleting liquid an aqueous solution containing at least about 5 percent by weight of at least one electrolyte selected from the group consisting of sodium hydroxide, potassium hydroxide, sodium aluminate, sodium silicate and sodium chromate and free of added alkaline earth compound, said pelleting liquid being incorporated into the chromite ore and sodium carbonate mixture in an amount sufficient to contribute about 0.5 to 25 percent of said electrolyte to the weight of said pellet, dry basis.

11. A green pellet of claim 10 containing a refractory diluent in an amount up to 200 percent of the weight of the chromite ore.

12. A dried green pellet comprising the pellet of claim 10 dried at a temperature up to 500°C. and having a compression strength of at least 10 lbs.

13. A green pellet of claim 10 wherein said electrolyte is sodium hydroxide.

* * * * *